US009254787B2

(12) United States Patent
Jaisimha et al.

(10) Patent No.: US 9,254,787 B2
(45) Date of Patent: *Feb. 9, 2016

(54) METHOD AND SYSTEM FOR UTILIZING SPREAD SPECTRUM TECHNIQUES FOR IN CAR APPLICATIONS

(71) Applicant: Panasonic Automotive Systems Company of America, division of Panasonic Corporation of North America, Peachtree City, GA (US)

(72) Inventors: Shree Jaisimha, Senoia, GA (US); Dallas Hickerson, Sharpsburg, GA (US); Tatsuya Fujisawa, Atlanta, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/567,069

(22) Filed: Dec. 11, 2014

(65) Prior Publication Data

US 2015/0158424 A1    Jun. 11, 2015

Related U.S. Application Data

(63) Continuation of application No. 13/097,146, filed on Apr. 29, 2011, now Pat. No. 8,937,537.

(51) Int. Cl.
*B60Q 1/00* (2006.01)
*B60Q 5/00* (2006.01)
(Continued)

(52) U.S. Cl.
CPC ............ *B60Q 5/005* (2013.01); *G06F 3/165* (2013.01); *G10L 19/018* (2013.01); *G11B 27/30* (2013.01); *H04H 20/31* (2013.01); *H04H 20/62* (2013.01); *H04H 60/37* (2013.01); *H04H 60/73* (2013.01)

(58) Field of Classification Search
CPC ....... G06F 21/10; G06F 21/16; G10L 19/018; G10L 25/48; G06T 1/0021; G08B 21/22; G08B 21/24
See application file for complete search history.

(56) References Cited

U.S. PATENT DOCUMENTS 5,940,432 A * 8/1999 Saito et al. ................ 375/148
6,198,996 B1   3/2001 Berstis
(Continued)

FOREIGN PATENT DOCUMENTS

AU   2008264146 A1   7/2009
WO   2009234289 A1   2/2009

OTHER PUBLICATIONS

Communication Pursuant to Rule 164(1) EPC, Partial Supplementary European Search Report issued on Jun. 5, 2015 for European Application Serial No. 12776996.6, European Patent Office.
(Continued)

*Primary Examiner* — Kerri McNally
*Assistant Examiner* — Renee Dorsey
(74) *Attorney, Agent, or Firm* — Laurence S. Roach, Esq.

(57) ABSTRACT

A method of operating an audio system in an automobile includes identifying a user of the audio system. An audio recording playing on the audio system is identified. An audio setting entered into the audio system by the identified user while the audio recording is being played by the audio system is sensed. The sensed audio setting is stored in memory in association with the identified user and the identified audio recording. The audio recording is retrieved from memory with the sensed audio setting being embedded in the retrieved audio recording as a watermark signal. The retrieved audio recording is played on the audio system with the embedded sensed audio setting being automatically implemented by the audio system during the playing.

11 Claims, 9 Drawing Sheets

(51) Int. Cl.
| | |
|---|---|
| *H04H 20/31* | (2008.01) |
| *H04H 20/62* | (2008.01) |
| *H04H 60/37* | (2008.01) |
| *H04H 60/73* | (2008.01) |
| *G10L 19/018* | (2013.01) |
| *G11B 27/30* | (2006.01) |
| *G06F 3/16* | (2006.01) |

(56) References Cited

U.S. PATENT DOCUMENTS

| | | | | |
|---|---|---|---|---|
| 7,017,043 | B1 * | 3/2006 | Potkonjak | 713/176 |
| 8,121,843 | B2 * | 2/2012 | Rhoads et al. | 704/270.1 |
| 2003/0187557 | A1 * | 10/2003 | Shockley | 701/39 |
| 2003/0236582 | A1 | 12/2003 | Zamir et al. | |
| 2004/0128514 | A1 | 7/2004 | Rhoads | |
| 2005/0057350 | A1 * | 3/2005 | Younse | 340/457.1 |
| 2005/0270146 | A1 | 12/2005 | Enya et al. | |
| 2007/0067079 | A1 * | 3/2007 | Kosugi | 701/35 |
| 2007/0266252 | A1 * | 11/2007 | Davis et al. | 713/176 |
| 2008/0159533 | A1 * | 7/2008 | Schryer et al. | 380/231 |
| 2009/0193255 | A1 * | 7/2009 | Baum et al. | 713/176 |
| 2011/0088053 | A1 * | 4/2011 | Lee | 725/19 |

OTHER PUBLICATIONS

Communication Including Extended European Search Report, Sep. 24, 2015, pp. 1-11, European Patent Office.

* cited by examiner

METHOD AND SYSTEM FOR UTILIZING SPREAD SPECTRUM TECHNIQUES FOR IN CAR APPLICATIONS

CROSS-REFERENCE TO RELATED APPLICATION

This application is a continuation of U.S. patent application Ser. No. 13/097,146, filed on Apr. 29, 2011, now U.S. Pat. No. 8,937,527, issued on Jan. 20, 2015, the disclosure of which is hereby incorporated by reference in its entirety for all purposes.

BACKGROUND OF THE INVENTION

1. Field of the Invention

The present invention relates to providing non-audible information within audio signals, and, more particularly, to providing non-audible information within audio signals for use in vehicles.

2. Description of the Related Art

It is known to use spread spectrum techniques to embed hidden data in the form of audio watermarks within audio content without the hidden data being perceivable by a listener. The modulation of the hidden data with a spread spectrum signal results in a bandwidth extension of the modulated message signal. This, in turn, yields a low power spectral density whose amplitude is lower than that of the narrow band audio signal. If the spectral levels of the message signals are kept at or below the masking threshold levels of the human auditory system, then the watermark is deemed inaudible by the human ear.

The typical payload data that can be embedded in the watermarks is on the order of 100 bits per second. While the encoder embeds the information within the audio signal, the receiver attempts to extract this information by performing a correlation operation with the spread spectrum code that was used to embed the data.

A problem is that it is difficult to employ watermarks in electrically noisy environments, such as an automobile. Ambient noise in an automobile, such as engine ignition noise or controller signals can have magnitudes nearly equal to the magnitude of the watermark. Electric and electric hybrid vehicles also produce electrical noise that may interfere with the watermark. Thus, it is difficult to separate the watermark from the noise such that the watermark can be discerned. Controller signals produced within a vehicle may include, for example, engine rpm information from the controller area network (CAN) bus signal.

Neither anticipated nor obvious in view of the prior art, however, are various methods of implementing the use of audio watermarks within an automotive environment, as described hereinbelow.

SUMMARY OF THE INVENTION

The invention may provide a method and systems of utilizing spread spectrum techniques for use in the automotive market. The present invention may provide novel design topologies and applications for use in car applications, including, for example, digital rights management. Each embodiment for in-car applications is described below in connection with a respective topology.

The present invention may provide schemes to incorporate the logic of watermarks in an encoder and decoder system which can be applied in an embedded system or application-specific integrated circuit (ASIC). Design topologies associated with these schemes may also be provided by the invention.

The invention comprises, in one form thereof, a method of operating an audio system in an automobile. A user of the audio system is identified. An audio recording playing on the audio system is identified. An audio setting entered into the audio system by the identified user while the audio recording is being played by the audio system is sensed. The sensed audio setting is stored in memory in association with the identified user and the identified audio recording. The audio recording is retrieved from memory with the sensed audio setting being embedded in the retrieved audio recording as a watermark signal. The retrieved audio recording is played on the audio system with the embedded sensed audio setting being automatically implemented by the audio system during the playing.

The invention comprises, in another form thereof, a method of operating a motor vehicle, including sensing a problem with the operation of the vehicle. An audible alert signal is played within the vehicle in response to the sensing of the problem. A watermark signal is embedded within the audible alert signal. The watermark signal includes information about the problem. The watermark signal is decoded from the alert signal to thereby obtain the information about the problem.

The invention comprises, in yet another form thereof, a method of operating an audio system in a vehicle. A watermark signal is embedded within an audio recording. The watermark signal includes metadata information associated with the audio recording. A user is enabled to request the metadata information via a user interface. In response to the request from the user, the metadata information is extracted from the audio recording. The extracted metadata information is played on the audio system in the form of audible speech.

An advantage of the present invention is that it enables information to be carried on an audio signal by use of hardware that already exists in the vehicle.

Another advantage of the present invention is that it may be scaled in conjunction with current trends in the automotive environment.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
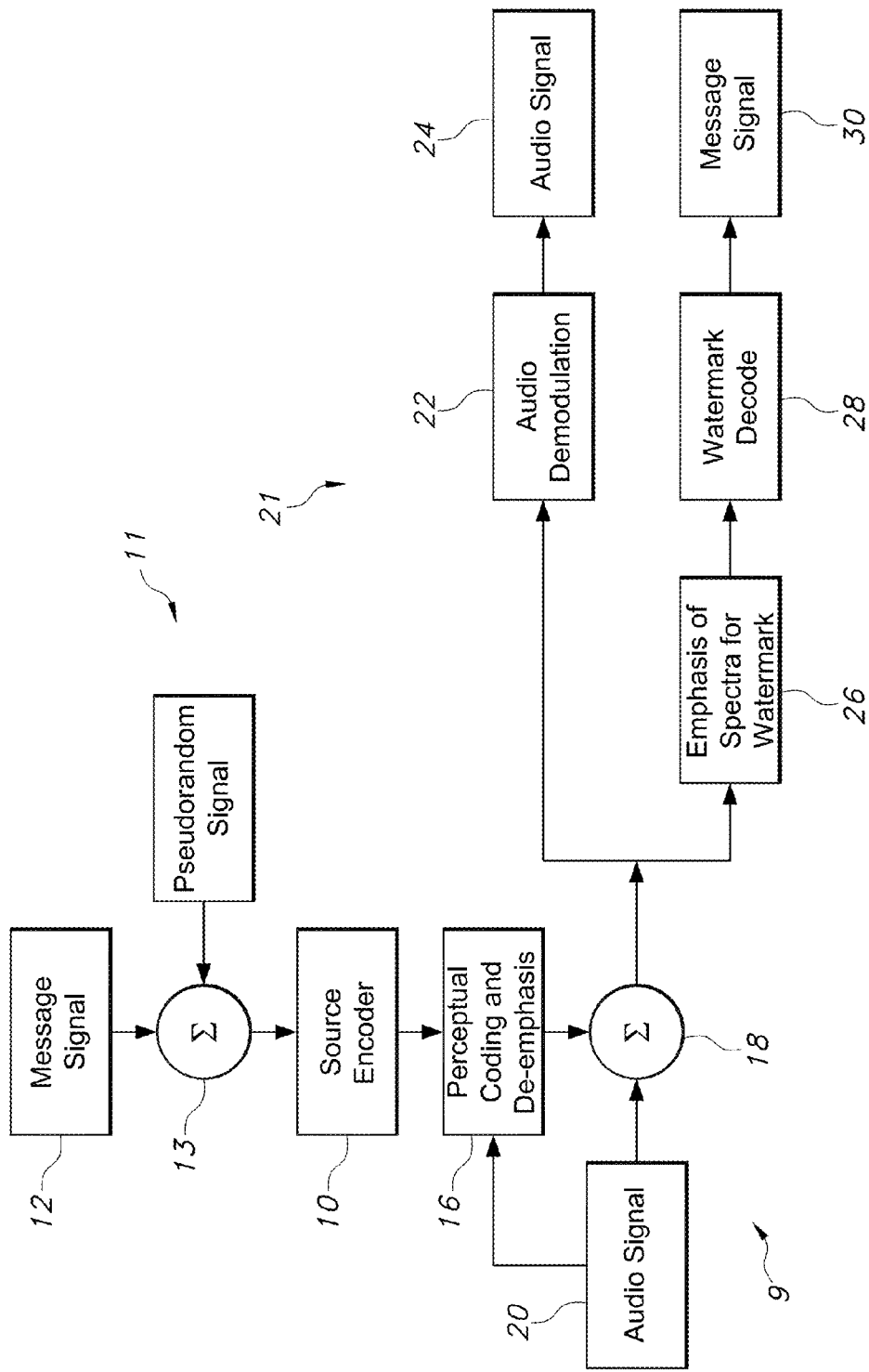
FIG. 1 is a block diagram illustrating one embodiment of a spread spectrum arrangement of the present invention.

FIG. 1 is a block diagram illustrating one embodiment of a spread spectrum arrangement 9 of the present invention for embedding information alongside audio wherein the data may be embedded in an unperceived manner. Arrangement 9 may include an transmitter/encoder section 11 and a receiver/decoder section 21. Transmitter/encoder section 11 includes a summer 13 that combines message signal 12 with a pseudo-random signal 14. Encoder section 11 further includes a source encoder 10, a perceptual coding and de-emphasis block 16, and a summer 18 that combines the output of block 16 with audio signal 20.

At a source encoder 10, message signal 12 is modulated by pseudorandom signal 14. Message signal 12 may include hidden data that is displayed to the listener as text, or information that can be used by the audio system, for example.

Figure 2A:
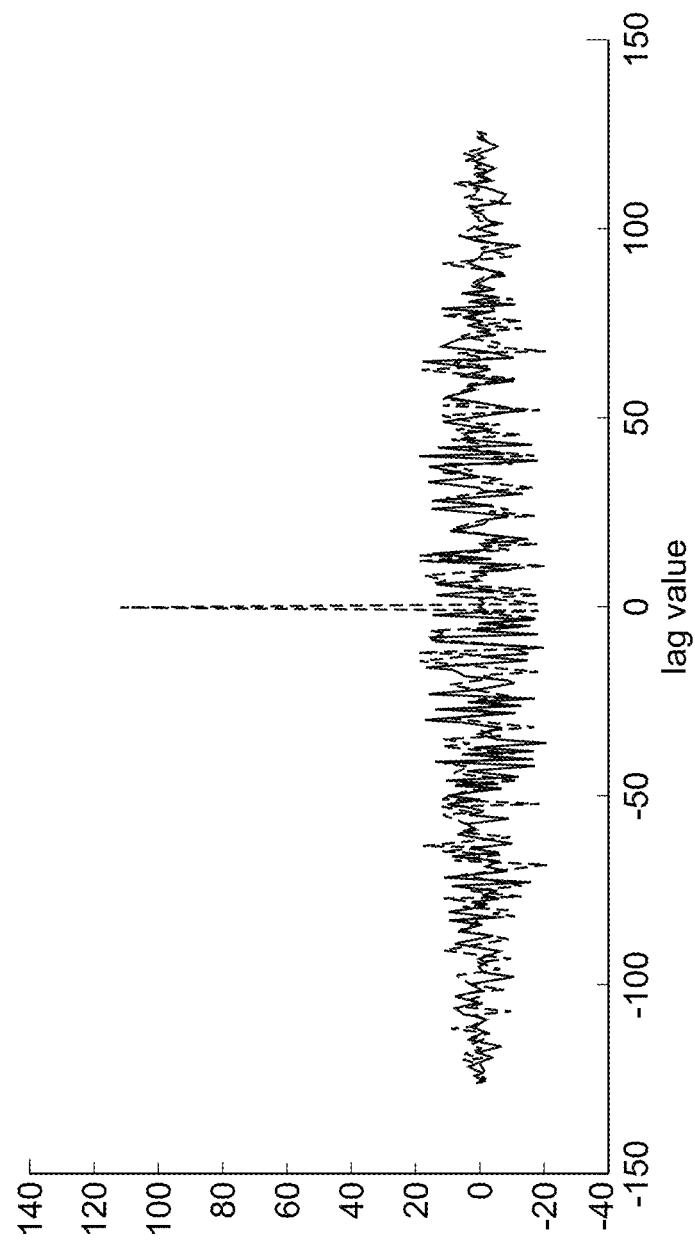
FIG. 2a is an example plot of the autocorrelation of a pseudorandom code that is suitable for use as the pseudorandom signal of FIG. 1.
Figure 2B:
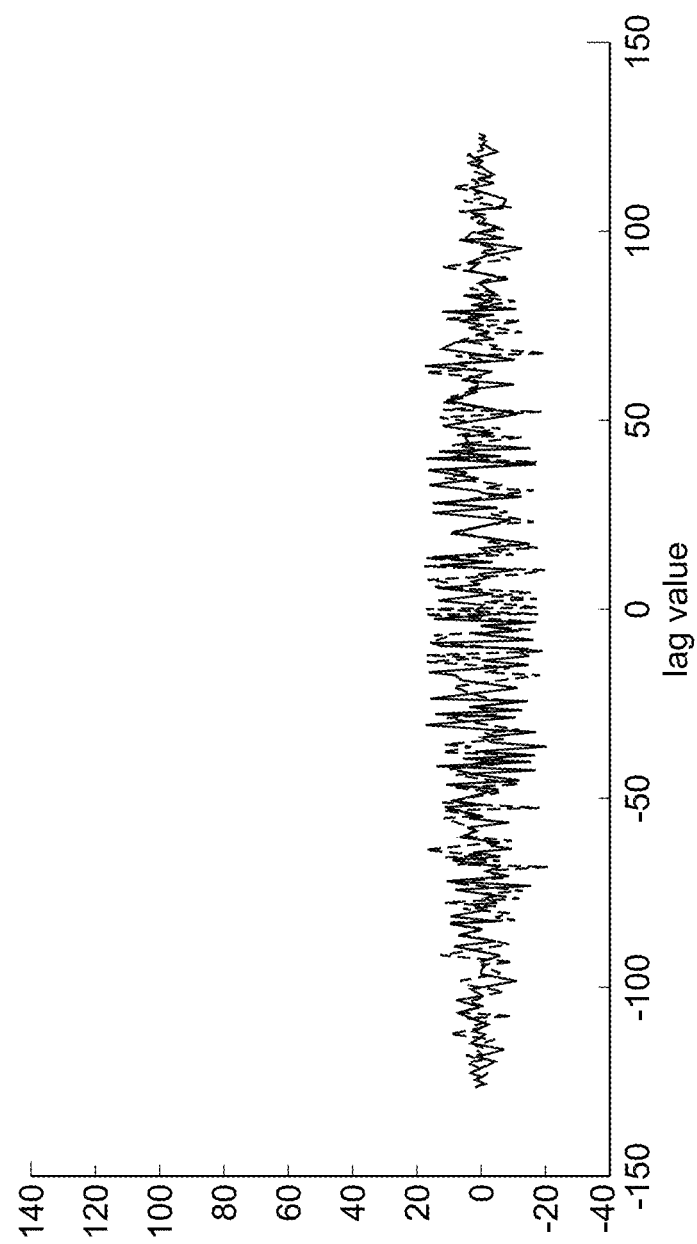
FIG. 2b is an example plot of the cross correlation between a pseudo random code and a peer pseudorandom code.

Pseudorandom signal 14 may include Gold Codes or other orthogonal codes whose autocorrelation is a large value but whose cross correlation value is rather small. FIG. 2a is an example plot of the autocorrelation of a pseudorandom code that is suitable for use as pseudorandom signal 14. FIG. 2b is an example plot of the cross correlation between a pseudo random code and a peer pseudorandom code. Synchronization may be called for.

Audio watermarking may be implemented with a variable injection level. If the injection level is low, then the audio of the watermark is not noticeable, but the bit error rate is high. The injection level can be increased to reduce the bit error rate at the expense of the watermark audio being perceivable. However, in a conventional car cabin environment, the ambient noise can be used to the watermarking's advantage such that the injection level can be kept higher than with a headphone user since ambient noise levels raise the threshold level. Spread spectrum techniques which may be utilized include Gold code and psuedo-random codes which are orthogonal. Even if the codes are tainted by the engine noise, the engine noise or electric noise has to exhibit the same correlation characteristic as the encoding in order to prevent the signal from being deciphered, as is verified by FIGS. 2a and 2b. Also, for a headphone user using RSA/RSE, the watermark may not be perceived. The injection levels for watermarking can be different for an RSE/RSA user wearing headphones than for a front seat automotive user listening via speakers.

The bits of the modulated message signal may be converted to a known source symbol in perceptual coding and de-emphasis block 16. The converted modulated message signal may then be summed at 18 with a digital audio signal 20. The pseudorandom codes may be binary in nature (e.g., 1s and 0s).

The message signal can include ASCII, Unicode (to scale for multi-languages) or other application-based protocol depending upon the particular use case application.

The input audio signal 20 may be, for example, speech or music that is sampled at 44.1 kHz or a higher rate. Engine noise, however, can be sampled at a lower rate, such as 2000 Hz for example. Since the audio signal can have different energy levels per unit audio frame based on the content, it becomes difficult for a system to ensure a constant signal-to-noise ratio between audio signal 20 and message signal 12. It may be desirable to maintain a relatively constant signal-to-noise ratio because the receiver may use a correlation-based demodulator wherein a threshold check is performed on the signal levels recovered at the output in order to determine whether the value is a 1 or a 0. An inconsistent signal-to-noise ratio may result in an increased bit error rate at the receiver.

In the threshold check, each audio frame may be examined and a masking threshold level may be mapped out in the frequency domain. The masking level may vary based on the signal content and the energy level of the frequencies. The gain of the spectrum of the embedded data which is modulated with the spread spectrum code may then be adjusted to ensure that the embedded data is either at the masking level or at a fixed level below the masking level. The gain may be calibratable by design in order to account for fact that the masking level may vary based on different people and their age groups and also the car and the engine used. This step of adjusting the gain may be called for because audio signals typically are time varying signals. This step of adjusting the gain may include examining each block of the digital audio signal. Audio frames of ten to fifteen milliseconds may ensure that the signal is stationary. The step of adjusting the gain may adapt the spectrum of the message signal to ensure that the message signal is at or near the masking threshold of the human auditory system. In addition to the human auditory system, another thing unique in the car cabin environment is the ambient noise levels which result from engine noise, road noise and wind noise. While the engine noise typically is around 500 Hz and below, road noise and wind noise span the mid and higher frequency range.

The system of the invention may use the rpm information from the car through the CAN bus or the vehicle network in adjusting the masking threshold value accordingly. Other a priori information that the car radio head unit has access to is the present volume of the current source being listened to, which also affects the masking threshold. The adjustment of the masking threshold value may prevent or inhibit the watermark from being perceived by the end user. The emphasis or de-emphasis blocks may control the gain and produce a constant signal-to-noise ratio.

In order to produce a constant signal-to-noise ratio, the audio frame may be first run through a psychoacoustic model which mirrors the human auditory system. The psychoacoustic model may analyze the tonal frequencies that dominate the audio frame and compute the forward and backward masking threshold within the frame. The psychoacoustic model may also keep track of temporal masking effects that may occur if a tone in one frame masks frequencies in the subsequent frames. The psychoacoustic model may output a masking threshold level for that particular audio frame in the frequency domain through filter coefficients. This may be achieved by first modeling the masking threshold by an all pole filter. In one embodiment, the filter is an autoregressive (AR) filter of filter order p. Using an input signal such as white noise and having the audio frame spectra, a Levinson Durbin recursive algorithm may be used to get the spectrum of the audio signal modeled using the AR filter coefficients. While speech signal inputs may call for p=10 for accurate modeling, music can take a higher pole order, such as 50 or more. Simulated engine noise, which includes spectral content up to 500 Hz, typically can be modeled with a pole order similar to speech because the fundamental and the harmonics up to only 500 Hz need to be reproduced. The engine noise may be dependent upon the rpm of the crankshaft.

A general way to distinguish between music and speech is through what is referred to as spectral flatness order. Assuming the audio signal is sampled at 44.1 kHz, music signals tend to have spectrum energy that has a larger span than that of speech signals. Speech signals tend to have energy up to 16 kHz and the energy tapers off above 16 kHz. Thus, music may be more "spectrally flat" than speech. Once Levinson Durbin recursion normalizes to the solution, the AR filter coefficients may represent an accurate model of the spectrum of the sampled audio frame.

Once the threshold model is attained in the frequency domain, a spectral mask is obtained. It may be desirable to ensure that the spectrum of the embedded message signal is at or below the spectral mask threshold in order to avoid the human ear being able to perceive the embedded message signal.

After the AR filter model coefficients have been obtained, the AR filter model may be multiplied over the embedded message signals spectrum in the frequency domain. This multiplication can be performed through convolution in the time domain or through fast Fourier transform techniques in the frequency domain. The use of fast Fourier transform techniques in the frequency domain may have the advantage of computational efficiency in the real time implementation on a DSP chipset.

The embedded message signal may then be summed with the audio signal. Because the masking threshold procedure may be applied across audio frames, and because the audio content varies across each frame (the audio signal is non-stationary and is time varying for frame sizes greater than 15 to 20 milliseconds), the masking threshold of one frame may be used as the starting value for the next frame in order to ensure that spectral continuity of the masking threshold is maintained and to prevent audio artifacts.

Decoder section 21 includes an audio demodulation block 22 that receives the output of summer 18, demodulates the output, and thereby produces an audio signal 24 that is ideally a replication of audio signal 20. Decoder section 21 also includes an emphasis of spectra for watermark block 26 that receives the output of summer 18. The output of block 26 is received by watermark decoder 28. Decoder 28 produces a message signal 30 that is ideally a replication of message signal 12.

Within receiver/decoder section 21, the audio signal may be demodulated directly without further processing. In order to recover the textual or contextual content of message signal 12, an operation may be performed that is an inverse of the perceptual threshold mask that was applied at the encoder. This inverse operation may ensure accurate extraction at the decoder. The decoder may use a correlation method to recover the embedded textual information that was in message signal 12.

A problem is that the receiver does not have information regarding the actual de-emphasis levels applied within transmitter/encoder section 11 for each frame. Thus, estimating the actual de-emphasis levels at the receiver side may be called for. The way this inverse operation may be performed is by examining the spectra of the audio signal with the embedded message signal at the decoder and creating a masking threshold based on the human auditory system in order to get an estimate of the masking threshold. This masking threshold may then be inverted and applied to the received signal at the decoder in order to enhance the spectrum of the received signal. This process may equalize both the embedded watermark and the audio signal. However, this is once again only an estimate. The equalization process may produce the inverted audio signal (i.e., audio signal+embedded watermark signal). However, because the power spectral density of the embedded watermark signal is still small compared to the actual audio signal, performing a correlation operation against the pseudorandom code may result in significant bit errors.

In order to avoid bit errors, an adaptive filter may be applied after the equalization stage. In one embodiment, the employed filter is a Wiener filter and may enhance the frequencies in the equalized signal that are dominated by the watermark rather than by the audio signal. Increasing the magnitude of the watermark's frequencies may be based on the premise that the power spectral density of the embedded watermark and the audio signal are uncorrelated in nature. Using minimum mean square optimization and using a Wiener filter tap size of fifty coefficients, the PSD (power spectral density) of the embedded watermark may be optimized using the error equation e(n)=equalized received signal−embedded watermark. Because the received audio signal is non-stationary, the filter may be adapted every 512 samples.

Once the power spectral density of the modulated watermark signal has been enhanced, the correlation operation may be performed to extract the data. A threshold may be used to compare the decoded binary data which may then be translated back to the encoded format (ASCII, Unicode, etc.). Watermark decoder 28 may include a correlation operation using the same pseudorandom code that is used to modulate the message signal at source encoder 10. Synchronization markers may be in place in order to synchronize watermark decoder 28.

The watermark signal may be compressed further after the encoder stage by MP3, Ogg Vorbis or other compression codecs. The decoder may have problems in getting a good estimate of the inverse equalization for emphasizing the watermark which can result in high bit error rates. To account for and rectify this difficulty, the design topology at the encoder may include a low pass filter that mirrors the psychoacoustic model profile of the compression algorithm to be used. For example, MP3 uses 11 kHz as the low pass cutoff frequency. If this is the case, then a 11 kHz cutoff low pass filter may be applied at the encoder during the creation of the masking threshold to be multiplied with the watermark modulated signal.

The present invention may include methods for recovering potential bit errors. Because bit errors can arise at the decoder/receiver, the following procedures can be used to recover potential bit errors. The different embodiments of the procedures vary in terms of complexity. In a simple embodiment, care may be taken in the protocol embedding procedure to repeat the watermark at fixed or random times inside the audio source. The receiver can then utilize a vote policy should bit errors arise. That is, the version of the watermark that is received the most number of times may be assumed to be correct.

In a more complex embodiment, forward error correction techniques such as Reed Solomon Encoding, BCH along with bit interleaving can be used to source encode the message which the receiver can decode and correct for any potential bit errors.

The present invention may provide novel topologies which may vary with the application or use case. For example, different design topologies may be used for different in car applications as detailed below. A first application that the present invention may be applied to is driver customization. It is known for OEMs to have different customizations for drivers 1, 2, 3, etc. in terms of the car radio system providing different predefined playlists and/or volume and audio settings for each driver. The present invention may enable unique customization. For example, when the car recognizes the specific driver either through key insertion or other biometric means, the car radio head unit can gather that driver's specific audio preferences for each particular song through information embedded in the audio watermark carried by the particular song and the car radio head unit may adjust the radio head unit accordingly.

Different users, when listening to the same song in a playlist, can have inherent preferences to the audio settings. Present technology allows for a specific driver volume to be stored per driver for all songs. However, the present invention may provide the ability to store volume level and other audio settings for each song listened to by different drivers wherein these audio settings are portable across different applications. One embodiment of a method of the invention for achieving such customization is illustrated in FIG. 3.

The term "storing back to nonvolatile" may be used herein to mean that the data is added to the song being listened to and the song is recorded back into the hard disk drive or flash drive in the same compression format in which the song was originally recorded.

Figure 3:
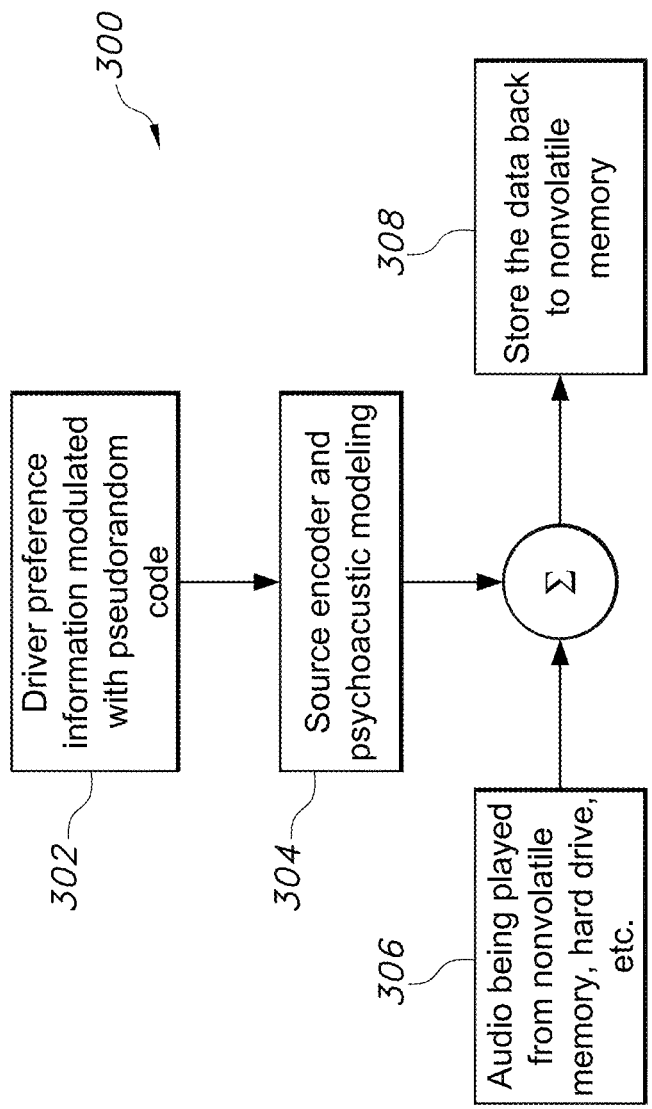
FIG. 3 is a flow chart of one embodiment of a method of the invention for real time audio watermarking for a song played in a radio head unit.

A method 300 of the invention for dynamic audio watermarking in a car radio head unit is illustrated in FIG. 3. Assume Driver 1 is listening to a song and changes the base, treble and volume to a level he likes. This information may be embedded back into the compressed audio as a watermark for later retrieval and usage. When Driver 2 is in the car and creates a different audio configuration (e.g., base, treble and volume levels), this different audio configuration can also be stored in association with the song and later retrieved. The driver preference information may be added to the watermark in the digital domain. That is, when the audio is decompressed and played out, the digital stream (i.e., before digital-to-analog conversion) may receive and/or embed the watermark carrying the driver preference information. The digital stream with the watermark thus embedded therein may then be stored back digitally into nonvolatile memory. This method may prevent any interaction with car ambient noise.

In a first step 302, driver preference information (e.g., base, treble and volume levels) is modulated with pseudorandom code. The pseudorandom code may include Gold Codes or other orthogonal codes whose autocorrelation is a large value but whose cross correlation value is rather small. The pseudorandom code may be similar to pseudorandom signal 14.

In step 304, source encoding and psychoacoustic modeling is performed. The source encoding embeds the driver preference information within an audio signal 306 that is being played from nonvolatile memory, hard drive, etc. The psychoacoustic modeling, which mirrors the human auditory system, may produce a constant signal-to-noise ratio. Other aspects of the psychoacoustic modeling may be similar to the psychoacoustic modeling described above with regard to FIG. 1. The audio signal with the driver preference information embedded therein is stored back in nonvolatile memory in a final step 308.

The method described in FIG. 3 may be particularly well suited for applications in which automotive companies employ cloud computing which allows drivers to store their content on external cloud servers. An advantage of using cloud computing is that users can upload content from their old vehicles to new vehicles. Audio watermarking ensures that the users' unique customizations are preserved in the process in which audio content is moved from one radio to another. For example, the audio setting for each song may be exported onto other radios. Thus, each song is portable and is able to carry driver-based contextual preferences, etc., and the new radio head unit is able to extract out the watermark content.

Another application for the present invention, in addition to driver customization as described above, is in redefining playlists. Looking laterally, the invention may be extended such that a playlist can be created by storing the linked playlist information in the watermark, thereby doing away with the *.pls and *.m3u concept. This feature of the invention may be particularly applicable to playlists involving multimedia (video and audio). The contextual information for each song browsed by the driver (e.g., instances of the user skipping the song, etc.) can be recorded in the watermark of the song and used to improve song selection. Thus, the present invention may provide a dynamic, virtual playlist.

Yet another application for the present invention, in addition to driver customization and redefining playlists as described above, is in electric cars. For example, the present invention may provide a way of embedding digital identifying markers and the means to embed close captioning information for safety alerts. Electric vehicles pose a safety hazard for pedestrians and disabled people when the car is in motion at low speeds because the does not produce enough noise for people to hear the car approaching. To address this problem, electric vehicle manufacturers are creating simulated engine noise by use of exterior speakers. Particularly, OEMs may add directional speakers at or near the bumper of the car. The audio that is output by the speaker is different for each car manufacturer. For example, the Nissan Leaf emits a polyphonic chime-like sound, while the Chevy Volt produces the sound of the horn to meet the legal mandate of government to protect pedestrians and the general public by outputting an audible alert.

The method and apparatus of the present invention may apply to electric vehicles in at least three ways. First, the invention may provide a means by which the OEM can protect its digital copyrights and trademarks associated with the simulated safety warning audio that the OEM has created. Such distinctive audio may become associated with the branding of the car. In one embodiment, the chime, simulated engine noise, etc., may be produced by the radio head unit. The radio head unit may embed a distinctive watermark in the audio, and the presence of the watermark in the audio used by a third party can be used to prove that the OEM's audio has been copied by the third party. Further, in the event that a customer/driver wants to personalize the audio emitted by his electric vehicle, the method and apparatus of the present invention provides a means to protect the copyright in the personalized audio.

In another automotive embodiment, not specific to electric vehicles, the invention may be used to communicate the full information associated with chimes to a disabled person. Known types of safety alerts inside and outside the car employ chimes, such as seat belt chimes, door open alerts or low gas beeps. For disabled people such as the blind and deaf, these types of chimes are not adequate to fully communicate the associated information. According to one embodiment of the present invention, the chime and beeps embed information associated with the alert, and this information may be displayed as text on the driver information display or audibly presented as speech. The display of text may be somewhat similar to closed captioning content that is presented on television.

In a specific embodiment for the blind, a cell phone having an external microphone can sample the external environmental sounds. With this external microphone, chimes with close captioning information in the form of a watermark can be extracted and sent through a text-to-speech system within the cell phone which can audibly inform the blind person of the information associated with the chime.

In another specific embodiment for the deaf, a cell phone with an external microphone can sample the external environmental sounds. The watermark may be extracted from chime signal by an application which can them translate the information, or a portion of the information, into contextual (e.g., visual) or vibration form.

Figure 4:
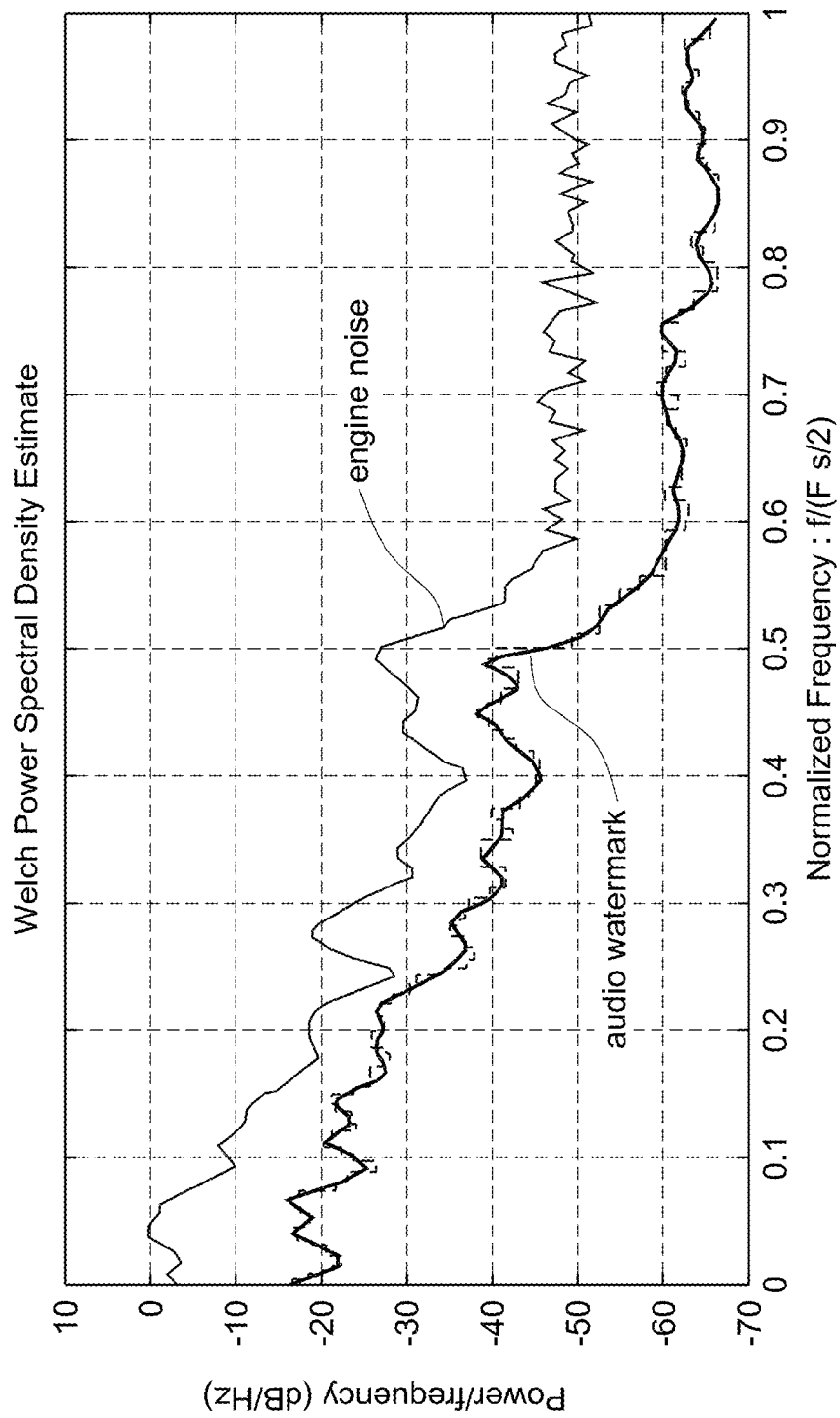
FIG. 4 is a plot of the spectral power densities of engine noise and an audio watermark signal according to one embodiment of the present invention.
Figure 5:
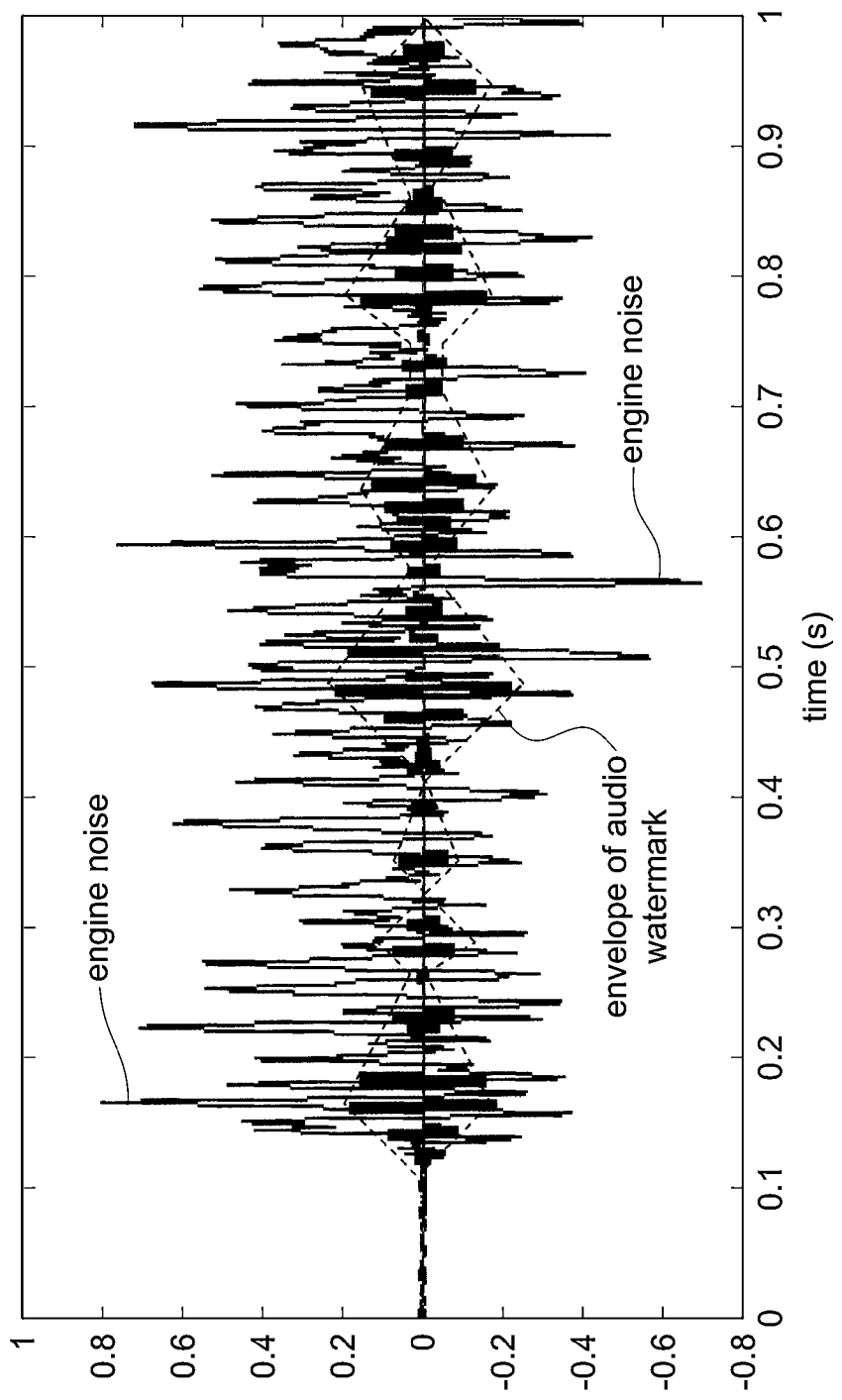
FIG. 5 is a time domain plot of engine noise and an audio watermark signal according to one embodiment of the present invention.

FIGS. 4 and 5 illustrate simulations of an audio watermark embedded inside the audio signal within a vehicle while the engine is running. Specifically, FIG. 4 is a plot of the spectral power densities of engine noise and an audio watermark signal according to one embodiment of the present invention. FIG. 4 includes a spectrogram of engine noise and a watermark whose power is maintained below the spectrum of the engine noise according to one embodiment of the invention. FIG. 5 is a time domain plot of engine noise and an envelope of an audio watermark signal according to one embodiment of the present invention. The levels of the watermark in the frequency and time domains may be modified, based on the RPM (revolutions per minute) of the engine crankshaft, such that the power of the watermark remains below the power of the engine noise.

Unlike audio signals, the engine noise frequency range as shown on FIG. 4 ranges from 20 to 500 Hz. Above 500 Hz the energy of the engine noise signal tapers down as demonstrated by experimentation.

There may be engine noise harmonics related to RPM. The frequency of the engine noise may be proportional to the RPM. For example, a four cycle, four cylinder engine running at 2400 rpm has two exhaust strokes for each revolution of the engine. Thus, the engine has 4800 strokes per minute and 80 strokes per second (80 Hz). Utilizing the Nyquist principle, the fundamental frequency is 80 Hz/2=40 Hz. As such the fundamental frequency of such an engine at 2400 rpm is 40 Hz and its relevant harmonic frequencies are 80 Hz, 120 Hz, 160 Hz, etc. According to the invention, if the power of the audio watermark is below the power of the engine noise for all relevant frequencies, then the watermark is not perceivable by the human ear.

In another embodiment in which the invention is applied to an electric vehicle, the invention is used in a lateral method for providing an alert that the vehicle is approaching, such as in the form of a horn sound. If electric cars are to have frontal direction speakers, the cars can also have directional microphones at the back of the vehicle. To limit noise pollution, the sound of the horn can be merely a low noise white noise or pink noise signal directed to the other user with watermarked textual information being carried by the signal. The other car can receive the signal by use of the microphone, decode the textual information, and create a horn-like sound inside the car.

In another automotive embodiment, the invention is applied to rear seat entertainment (RSE). In the car environment, the driver in the front seat typically can query the metadata of the song via an interface that includes a display. For example, if a driver or front passenger presses INFO when playing a CD or Mp3 disc, the CD text or ID3 tag may be displayed as part of the metadata embedded with the song. The rear users may obtain this information only if they have a rear display, which is typically provided only in high end systems. The invention, however, may be used to make this information more accessible to rear seat passengers. In Rear System Audio and low end RSE systems, according to the present invention, the metadata may be embedded within the audio and/or alongside the spectrum of the audio. When the rear user wants to hear the information pertaining to the song, such as the song's title, the rear user enters his request into the rear seat user interface. The radio head unit can make use of the text-to-speech software that may be available in a radio head unit software platform to sound out this requested metadata by mixing this spoken audio simultaneously with the audio being heard by the user. This feature may avoid the cost of a rear seat display by operating with the existing hardware infrastructure.

In yet another embodiment, the invention is used in scaling for broadcast technology trends. The present invention may encompass the recent trends in the broadcast market. Broadcast technology is shifting from analog FM to digital broadcasts that include DAB, DAB+, DMB and HD IBOC. These digital standards utilize OFDM (orthogonal frequency division modulation) which employ side channels about a carrier frequency. Typically, a carrier frequency has ensemble stations in the sub band frequencies. As the cars get connected to the internet through 3G cell phones or through other wireless means, it may be possible to measure the listenership of the stations and the browsing information by drivers in real time. Because the digital signals operate not in the carrier frequency but in the sub bands, the stations may embed a watermark over their broadcast audio. Then it may be possible to determine through the connected backbone which stations are being listened to. The radio head unit may decode the watermark in order to have this information. This method can also scale for mobile digital television for use in cars.

When a user listens to the secondary channel, he is tuned to the primary station's frequency but is actually listening to the secondary channel which may or may not be associated or affiliated with the primary station's network. As cars get into the Wimax network, the market trends may shift to offering a user a 'paid station access' if he participates in marketing feedback. The HD IBOC station may transmit the pseudorandom code to the radio receiver for each primary and secondary station or even program content being broadcast. The receiver may then decode the watermark and have this information ready for the Wimax or wireless network for access by the marketing survey organization.

In yet another automotive embodiment, the present invention is used for vehicle diagnostics. Diagnostics for combustion engine vehicles may be determined by the sound of the engine. Expert mechanics can distinguish the problem based on the sound of the engine, etc. With electric cars, determining a source of problems with the vehicle may entail detailed electronic diagnostics. According to the invention, chimes or other alerts may be used to quickly inform the mechanics of the problem. To avoid having multiple unique chime tones, a single fixed chime may be embedded with information pertaining to the root cause of the failure mode. The mechanic can use a microphone-based decoder system which can extract the failure mode information.

The power spectral density of the watermarked audio signal (e.g., after the audio signal has been combined with the message signal) may be flatter than the power spectral density of the original audio signal. The original audio signal's power spectral density may have more energy at low frequencies than at higher frequencies, but the watermarked audio signal's power spectral density may be flatter, with nearly the same energy at higher frequencies as at lower frequencies.

At the receiver, the demodulation process may be via correlation principle. This process may use the same spread spectrum waveform that is used to encode the message and audio signal at the emitter side. The same spread spectrum waveform may be used to demodulate the data by making a threshold comparison of the symbol data gathered.

Synchronization may be called for because the spread spectrum signals have have very high autocorrelation and low cross-correlation as shown in FIG. 2a. Even if perfect synchronization is ensured, bit errors may arise at the receiver side. The spread spectrum waveform may be a realization of random values in the [−1 to +1] range, and the audio signal may be modeled as a random variable with a mean and variance that varies from frame to frame based on its content.

Figure 6:
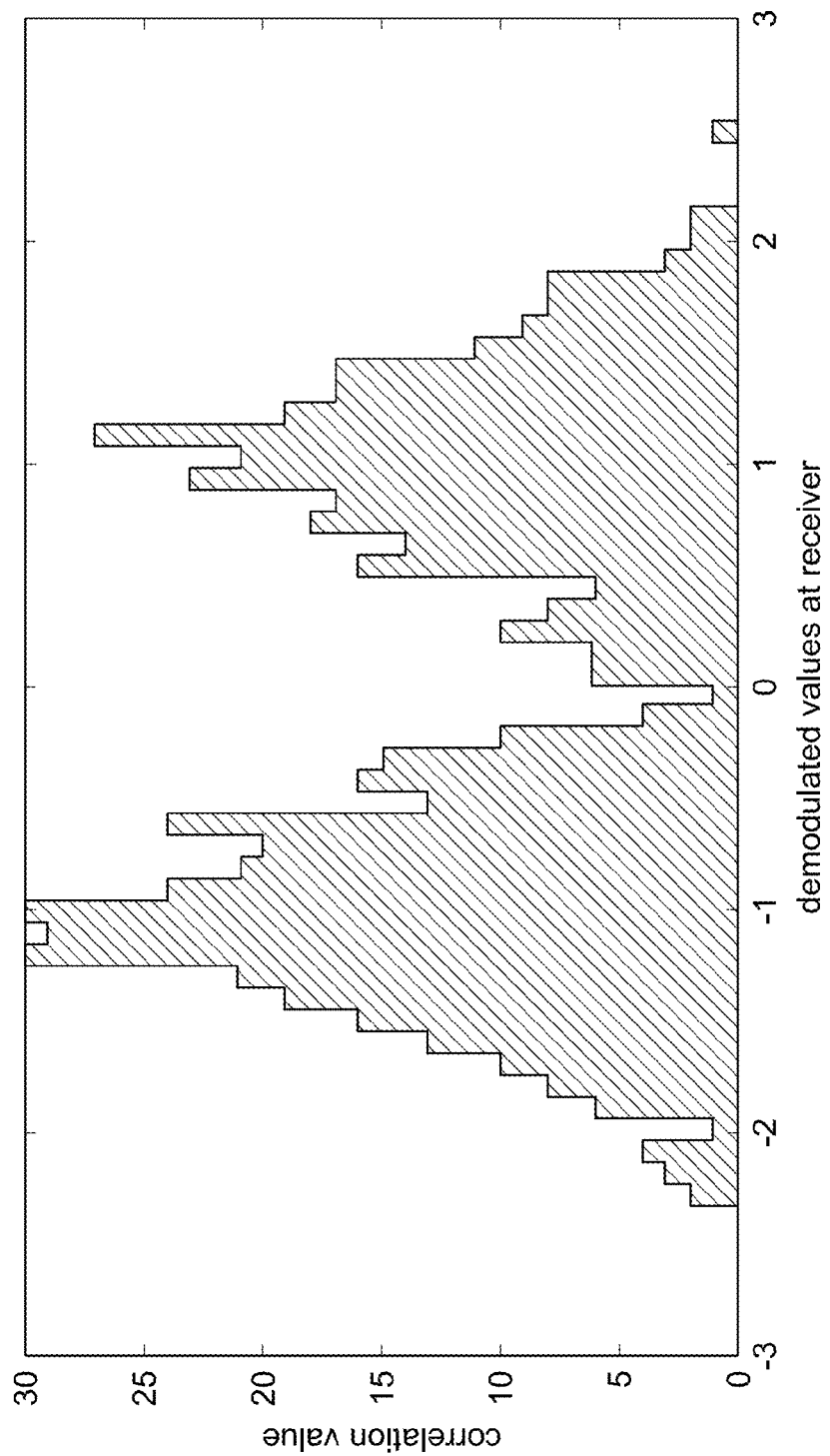
FIG. 6 is a histogram plot for bimodal distribution at the receiver according to one embodiment of the present invention.

FIG. 6 shows the probability distribution function at the receiver based on empirical samples received. Because the encoding is in the range of −1 and +1, the distribution is bimodal. The overlap area around threshold value of 0 illustrates how bit errors can arise if the watermark injection strength is too low or if the watermarked signal has undergone compression processes after the encoder side. The compression process may involve filtering operations which can create artifacts.

At the encoder there may be a demodulation loop which monitors the bit error rate for a particular frame and adjusts the associated gain. The gain may help overcome any potential noise or artifacts that can arise from subsequent compression processes. However, if the injection gain of the watermark is very high, then the watermark may have good reception at the receiver but also may be perceivable. The bit error rate can be controlled by increasing the watermark gain levels during the initial modulation of the message signal with the spread spectrum sequence. The gain may decrease the overlap of the bimodal probability distribution function as shown in FIG. 6.

At the emitter, a receiver-like block may check each frame for what the gain should be in order to set the limit for the bit error rate. To prevent the audio watermark from being heard, the watermarked signal (and not the music signal) is subject to the psychoacoustic masking threshold of the current audio frame being analyzed. This inhibits the watermark signal from being perceived.

Figure 7:
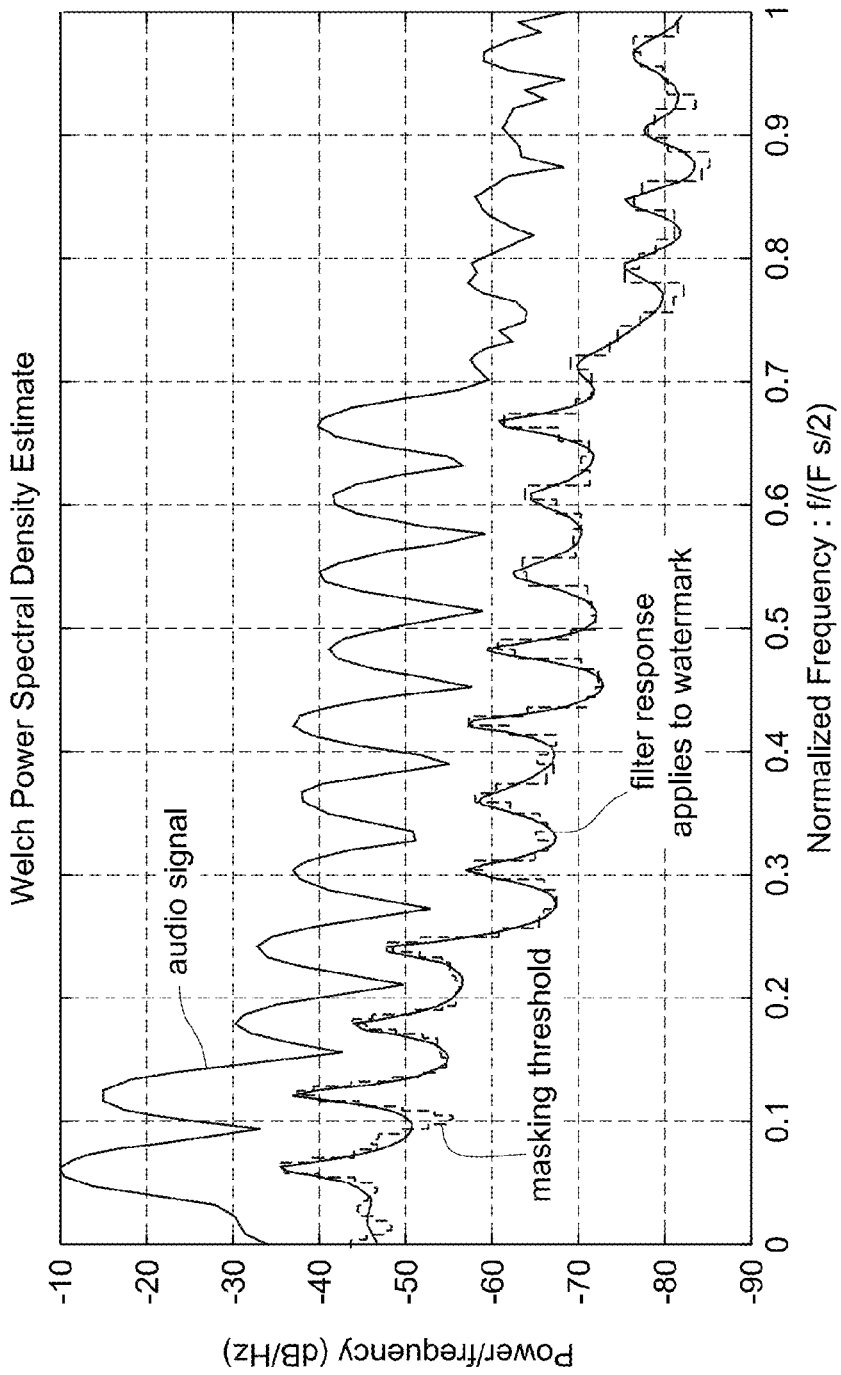
FIG. 7 is a plot of the spectral power densities a masking threshold applied to a watermark signal and the associated audio signal according to one embodiment of the present invention.

FIG. 7 is a plot of the spectral power densities a masking threshold applied to a watermark signal and the associated audio signal according to one embodiment of the present invention. The masking threshold is shown in dashed lines closely corresponding to a plot of the resulting filter response that applies to the watermark signal. Thus, the masking threshold may cause the spectral power density of the watermark signal to be on par with the masking threshold of the human ear for the particular audio frame that is being analyzed by the algorithm.

Figure 8:
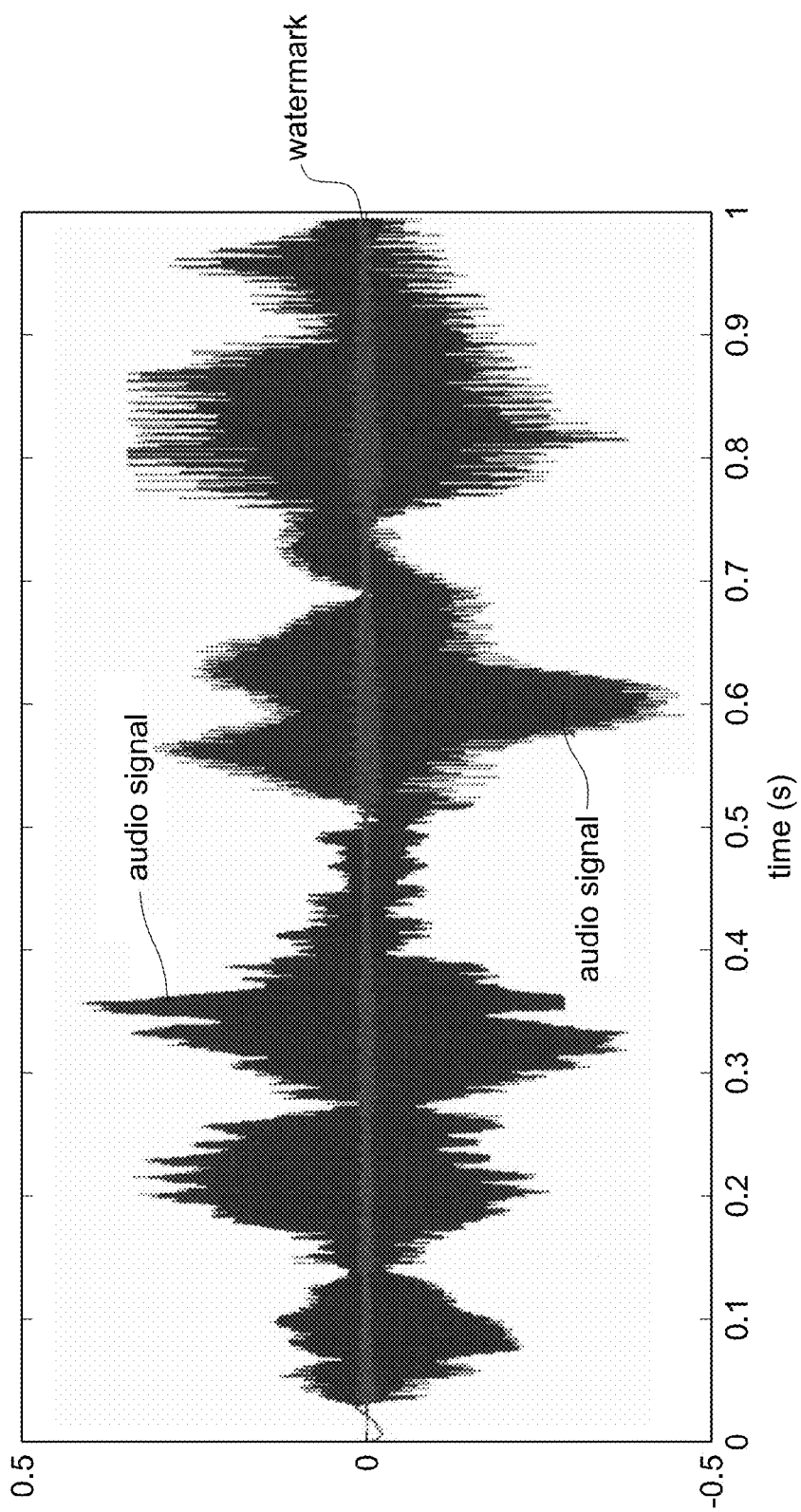
FIG. 8 is a time domain plot of a music audio signal and an underlying watermark which is masked inside the signal.

FIG. 8 is a time domain plot of the envelopes of a music audio signal and an underlying watermark which is masked inside the signal. Here too in the time domain, the power of the watermark signal is consistently less that the power of the audio signal.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating an audio system in an automobile, comprising the steps of:
   identifying a user of the audio system;
   identifying an audio recording playing on the audio system;
   sensing an audio setting entered into the audio system by the identified user while the audio recording is being played by the audio system;
   storing the sensed audio setting in memory in association with the identified user and the identified audio recording;
   retrieving the audio recording from memory with the sensed audio setting being embedded in the retrieved audio recording;
   playing the retrieved audio recording on the audio system with the embedded sensed audio setting being automatically implemented by the audio system during the playing;
   providing a set of audio recordings;
   identifying which of the audio recordings in the set that the user skips while listening to the set;
   storing in memory the audio recordings in the set that the user skips while listening to the set; and
   automatically skipping the audio recordings previously skipped by the user when playing the set of audio recordings.

2. The method of claim 1 wherein the audio recordings are automatically skipped only if it is determined that a same user that previously skipped the audio recordings is currently using the audio system.

3. A method of operating an audio system in a vehicle, comprising the steps of:
   embedding a signal within an audio recording, the signal including metadata information associated with the audio recording;
   enabling a user to request the metadata information via a user interface associated with a rear seat of the vehicle;
   in response to the request from the user, extracting the metadata information from the audio recording; and
   playing the extracted metadata information on the audio system in the form of audible speech.

4. A method of operating an audio system in a vehicle, comprising the steps of:
   embedding a signal within an audio recording, the signal including metadata information associated with the audio recording;
   enabling a user to request the metadata information via a user interface;
   in response to the request from the user, extracting the metadata information from the audio recording; and
   playing the extracted metadata information on the audio system in the form of audible speech, wherein the extracted metadata information is played simultaneously with the audio recording.

5. A method of operating an audio system in a vehicle, comprising the steps of:
   embedding a signal within an audio recording, the signal including metadata information associated with the audio recording, the metadata information including a title and/or artist of the audio recording;
   enabling a user to request the metadata information via a user interface;
   in response to the request from the user, extracting the metadata information from the audio recording; and
   playing the extracted metadata information on the audio system in the form of audible speech.

6. A method of operating an audio system in a vehicle, comprising the steps of:
- embedding a signal within an audio recording broadcast from a station, the signal including metadata information associated with the audio recording, the metadata information including an identification of the station;
- enabling a user to request the metadata information via a user interface;
- in response to the request from the user, extracting the metadata information from the audio recording; and
- playing the extracted metadata information on the audio system in the form of audible speech.

7. The method of claim 6, wherein a plurality of stations broadcast respective said audio recordings via the Internet, the method comprising the further step of extracting the station identifications from the audio recordings carried on a backbone of the Internet to thereby measure a respective number of listeners of each of the broadcasting stations.

8. The method of claim 1 wherein the embedded sensed audio setting is automatically implemented by the audio system only if the identified user is again identified as being a current user of the audio system.

9. The method of claim 1 wherein the audio setting is a volume setting, a bass setting, a treble setting, a balance setting, and/or a fade setting.

10. The method of claim 1 wherein the audio recording is stored in memory with the sensed audio setting being embedded in the stored audio recording as a watermark signal.

11. The method of claim 1 comprising the further step of modulating the sensed audio setting with pseudorandom code.

* * * * *